(12) United States Patent
Kasuga

(10) Patent No.: US 11,061,523 B2
(45) Date of Patent: Jul. 13, 2021

(54) CONTENT SHARING SYSTEM, CONTENT SHARING METHOD, AND PROGRAM

(71) Applicant: Rakuten, Inc., Tokyo (JP)

(72) Inventor: Takaya Kasuga, Tokyo (JP)

(73) Assignee: RAKUTEN, INC., Tokyo (JP)

( * ) Notice: Subject to any disclaimer, the term of this patent is extended or adjusted under 35 U.S.C. 154(b) by 58 days.

(21) Appl. No.: 16/632,875

(22) PCT Filed: Oct. 10, 2017

(86) PCT No.: PCT/JP2017/036632
§ 371 (c)(1),
(2) Date: Jan. 22, 2020

(87) PCT Pub. No.: WO2019/073515
PCT Pub. Date: Apr. 18, 2019

(65) Prior Publication Data
US 2020/0186587 A1   Jun. 11, 2020

(51) Int. Cl.
*G06F 3/048* (2013.01)
*G06F 3/0481* (2013.01)
(Continued)

(52) U.S. Cl.
CPC ............ *G06F 3/048* (2013.01); *G06F 3/0481* (2013.01); *G06F 3/0482* (2013.01);
(Continued)

(58) Field of Classification Search
CPC .... G06F 3/048; G06F 3/0481; G06F 3/04892; G06F 16/168; G06F 16/176;
(Continued)

(56) References Cited

U.S. PATENT DOCUMENTS 10,628,631 B1 * 4/2020 Smuda ................. G06F 40/143
2006/0282548 A1   12/2006 Yoshida et al.
(Continued)

FOREIGN PATENT DOCUMENTS

JP    2006331309 A    12/2006
JP    5977450 B2      8/2016
WO   2016067363 A1   5/2016

*Primary Examiner* — Jeanette J Parker
(74) *Attorney, Agent, or Firm* — HEA Law PLLC

(57) ABSTRACT

Provided are a content sharing system, a content sharing method, and a program, which are capable of appropriately processing an operation of a user on shared content after scrolling by an operation of another user is performed. An estimated scroll amount identification module identifies an estimated scroll amount during a predetermined time period until a timing t3 based on a scroll amount of the shared content by the operation of another user performed before a timing t2. An actual scroll amount identification module identifies an actual scroll amount during the predetermined time period until the timing t3. An object corresponding position identification module identifies a second position, which is separated from a first position by a difference between the actual scroll amount and the estimated scroll amount. An object processing execution module executes processing on an object associated with the second position.

6 Claims, 12 Drawing Sheets

(51) Int. Cl.
  *G06F 3/0482* (2013.01)
  *G06F 3/0485* (2013.01)
  *H04L 29/08* (2006.01)
  *G06F 16/16* (2019.01)
  *G06F 16/176* (2019.01)
  *G06F 16/957* (2019.01)
  *G06F 3/0489* (2013.01)

(52) U.S. Cl.
  CPC ........ *G06F 3/0485* (2013.01); *G06F 3/04812* (2013.01); *G06F 3/04892* (2013.01); *G06F 16/168* (2019.01); *G06F 16/176* (2019.01); *G06F 16/1767* (2019.01); *G06F 16/957* (2019.01); *H04L 67/025* (2013.01)

(58) Field of Classification Search
  CPC ............... G06F 16/1767; G06F 16/957; G06F 3/04812; G06F 3/0482; G06F 3/0485; G06F 3/04842; G06F 13/00; H04L 67/025; H04L 67/02
  See application file for complete search history.

(56) References Cited

U.S. PATENT DOCUMENTS

| | | | |
|---|---|---|---|
| 2012/0089659 A1* | 4/2012 | Halevi | G06F 3/04842 709/201 |
| 2013/0002532 A1* | 1/2013 | Raffle | G06F 3/1423 345/156 |
| 2014/0164934 A1* | 6/2014 | Yang | G06Q 10/101 715/738 |
| 2015/0149404 A1* | 5/2015 | Lock | G06F 16/176 707/608 |
| 2016/0192008 A1 | 6/2016 | Terui | |
| 2016/0371752 A1 | 12/2016 | Taniuchi et al. | |
| 2017/0285895 A1* | 10/2017 | Nathwani | G06F 3/0484 |
| 2018/0081909 A1* | 3/2018 | Higashibeppu | G06F 16/5866 |
| 2018/0260368 A1* | 9/2018 | Vagell | G06F 40/197 |

\* cited by examiner

FIG.6

| SERIAL NUMBER | CURSOR POSITION INFORMATION | OBJECT INFORMATION (SELECTION BOX 48a) | | | |
|---|---|---|---|---|---|
| | | POSITION INFORMATION | SIZE INFORMATION | SCROLL USER INFORMATION | CLICKABILITY INFORMATION |
| 1 | (x11,y11) | (x21,y21) | (a21,b21) | USER B | Y |
| 2 | (x12,y12) | (x22,y22) | (a22,b22) | USER B | Y |
| 3 | (x13,y13) | (x23,y23) | (a23,b23) | USER B | Y |

CONTENT SHARING SYSTEM, CONTENT SHARING METHOD, AND PROGRAM

CROSS REFERENCE TO RELATED APPLICATIONS

This application is a National Stage of International Application No. PCT/JP2017/036632 filed on Oct. 10, 2017. The contents of the above document is incorporated herein by reference in its entirety.

TECHNICAL FIELD

The present invention relates to a content sharing system, a content sharing method, and a program.

BACKGROUND ART

There exist systems in which a plurality of users can perform operations on shared content. For example, in Patent Literature 1, there is described a system in which any one of a plurality of users can perform a drawing operation on a shared whiteboard. In the technology described in Patent Literature 1, the details of the drawing operation on a whiteboard displayed on a display unit of a terminal device are reflected on a whiteboard displayed on a display unit of another terminal device connected to the terminal device via a network.

CITATION LIST

Patent Literature

[PTL 1] JP 2006-331309 A
[PTL 2] JP 5977450 B2
[PTL 3] WO 2016/067363 A1

SUMMARY OF INVENTION

Technical Problem

The inventors of the present invention are investigating implementation of a system in which a plurality of users can perform operations on scrollable shared content, for example, webpages. In such a system, in a case where the user is to perform an operation of selecting an object, when the shared content is scrolled by an operation of another user, the object intended by the user may not be selected. Further, in such a situation, an object different from that intended by the user may be selected.

In the technology described in Patent Literature 1, scrolling is not expected in the first place, and hence such a situation cannot be handled. Even with the technologies described in Patent Literature 2 and Patent Literature 3, in which processing is performed in accordance with the intention of the user, such a situation cannot be handled.

The present invention has been made in view of the above-mentioned circumstances. It is an object of the present invention to provide a content sharing system, a content sharing method, and a program, which are capable of appropriately processing an operation of a user on shared content after scrolling by an operation of another user is performed.

Solution to Problem

In order to solve the above-mentioned problem, according to one embodiment of the present invention, there is provided a content sharing system including: operation identification means for identifying that an operation of an execution instruction of a predetermined processing has been performed, the operation being an operation of specifying a first position on shared content operable by both a first user and a second user, which has been performed by the first user; estimated scroll amount identification means for identifying an estimated scroll amount of the shared content by an operation of the second user during a predetermined time period until a timing of the operation of the first user, based on a scroll amount of the shared content by the operation of the second user performed before a time earlier than the timing of the operation of the first user by the predetermined time period; actual scroll amount identification means for identifying an actual scroll amount, which is an actual scroll amount of the shared content by the operation of the second user during the predetermined time period until the timing of the operation of the first user; position identification means for identifying a second position on the shared content, which is separated from the first position on the shared content by a difference between the actual scroll amount and the estimated scroll amount; and processing execution means for executing the predetermined processing on an object associated with the second position on the shared content.

In one aspect of the present invention, the content sharing system further includes scroll speed identification means for identifying a scroll speed of the shared content by the operation of the second user at a time earlier than a timing at which the operation of the first user is received by the predetermined time period, based on the scroll amount of the shared content by the operation of the second user performed before the time earlier than the timing at which the operation of the first user is received by the predetermined time period, and the estimated scroll amount identification means is configured to identify the estimated scroll amount based on the scroll speed.

In this aspect, the estimated scroll amount identification means is configured to identify a product of the identified scroll speed and the predetermined time period as the estimated scroll amount.

Further, in one aspect of the present invention, the processing execution means is configured to execute processing on an object that is arranged in the shared content and has a length from the second position within a predetermined length.

Further, according to one embodiment of the present invention, there is provided a content sharing method including the steps of: identifying that an operation of an execution instruction of a predetermined processing has been performed, the operation being an operation of specifying a first position on shared content operable by both a first user and a second user, which has been performed by the first user; identifying an estimated scroll amount of the shared content by an operation of the second user during a predetermined time period until a timing of the operation of the first user, based on a scroll amount of the shared content by the operation of the second user performed before a time earlier than the timing of the operation of the first user by the predetermined time period; identifying an actual scroll amount, which is an actual scroll amount of the shared content by the operation of the second user during the predetermined time period until the timing of the operation of the first user; identifying a second position on the shared content, which is separated from the first position on the shared content by a difference between the actual scroll amount and the estimated scroll amount; and executing the predetermined processing on an object associated with the second position on the shared content.

Further, according to one embodiment of the present invention, there is provided a program for causing a computer to execute the procedures of: identifying that an operation of an execution instruction of a predetermined processing has been performed, the operation being an operation of specifying a first position on shared content operable by both a first user and a second user, which has been performed by the first user; identifying an estimated scroll amount of the shared content by an operation of the second user during a predetermined time period until a timing of the operation of the first user, based on a scroll amount of the shared content by the operation of the second user performed before a time earlier than the timing of the operation of the first user by the predetermined time period; identifying an actual scroll amount, which is an actual scroll amount of the shared content by the operation of the second user during the predetermined time period until the timing of the operation of the first user; identifying a second position on the shared content, which is separated from the first position on the shared content by a difference between the actual scroll amount and the estimated scroll amount; and executing the predetermined processing on an object associated with the second position on the shared content.

BRIEF DESCRIPTION OF DRAWINGS

FIG. 6 is a table for showing an example of history information.

DESCRIPTION OF EMBODIMENTS

Now, an embodiment of the present invention is described with reference to the drawings.

Figure 1:
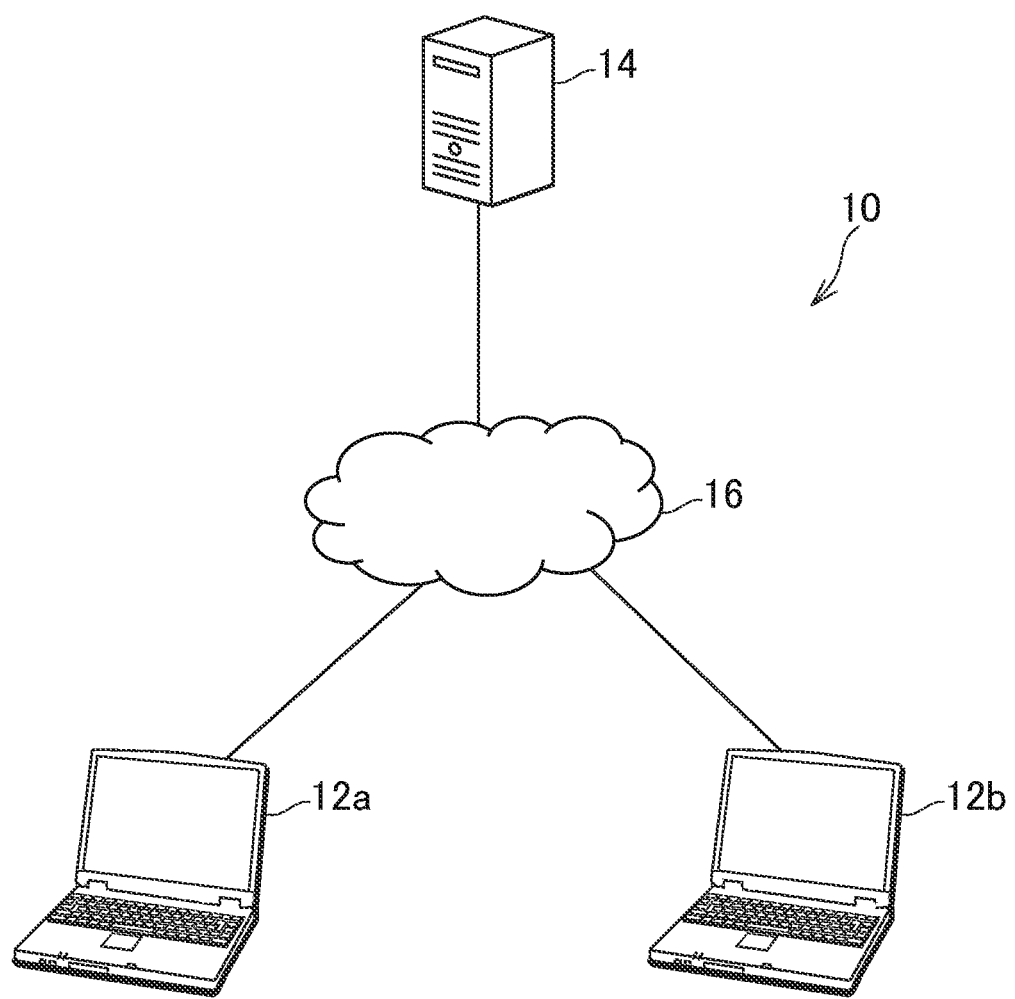
FIG. 1 is a diagram for illustrating an example of an overall configuration of a content sharing system according to an embodiment of the present invention.

FIG. 1 is a diagram for illustrating an example of an overall configuration of a content sharing system 10 according to the embodiment of the present invention. As illustrated in FIG. 1, the content sharing system 10 in this embodiment includes two user terminals 12 (12a, 12b) and a server 14. The user terminal 12a, the user terminal 12b, and the server 14 are connected to a computer network 16, for example, the Internet. Therefore, the user terminal 12a, the user terminal 12b, and the server 14 can communicate to and from each other via the computer network 16.

In this embodiment, for example, the user terminals 12 are a computer such as a personal computer, a tablet terminal, or a smartphone. A web browser is installed on each user terminal 12 in this embodiment.

Figure 2:
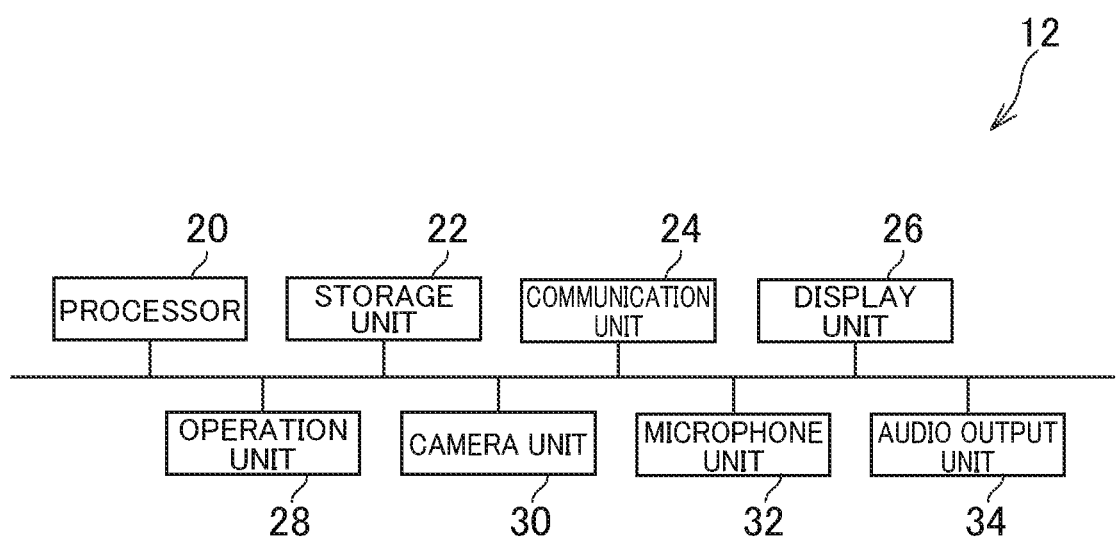
FIG. 2 is a diagram for illustrating an example of a configuration of a user terminal according to an embodiment of the present invention.

As illustrated in FIG. 2, for example, each user terminal 12 includes a processor 20, a storage unit 22, a communication unit 24, a display unit 26, an operation unit 28, a camera unit 30, a microphone unit 32, and an audio output unit 34.

The processor 20 is, for example, a program control device, for example, a central processing unit (CPU), which is configured to operate in accordance with a program installed on the user terminal 12. The storage unit 22 is, for example, a storage element such as a ROM or a RAM, or a hard disk drive. The communication unit 24 is a communication interface such as a network board or a wireless LAN module. The display unit 26 is, for example, a display such as a liquid crystal display or an organic EL display. The operation unit 28 is, for example, a user interface such as a mouse, a keyboard, or a touch pad, which is configured to output to the processor 20 input data corresponding to operation input. The camera unit 30 is a camera, for example, a digital camera. The microphone unit 32 is, for example, a microphone configured to convert a surrounding sound into sound data to output the sound data to the processor 20. The audio output unit 34 is a device such as headphones or a speaker, which is configured to output a sound to the user.

The server 14 is a server computer, for example, a web server, which is configured to provide shared content operable by both the user of the user terminal 12a and the user of the user terminal 12b. Examples of the shared content include webpages and images. The user of the user terminal 12a is hereinafter referred to as "user A", and the user of the user terminal 12b is hereinafter referred to as "user B". A video chat function between the user terminals 12 is implemented on the server 14 in this embodiment. A function for synchronizing the shared content displayed on the display unit 26 of the user terminal 12a with the shared content displayed on the display unit 26 of the user terminal 12b is also implemented on the server 14 in this embodiment.

In this embodiment, for example, through use of the camera unit 30, the microphone unit 32, and the audio output unit 34, the user A and the user B can talk to each other by voice while looking at the face of the other user via video chat.

The shared content displayed on the display unit 26 of the user terminal 12a and the shared content displayed on the display unit 26 of the user terminal 12b are synchronized. Therefore, the user A and the user B can talk to each other by voice while seeing the same part of the same shared content.

In this embodiment, for example, the details of the operation performed at the user terminal 12a are reflected not only in the shared content displayed on the display unit 26 of the user terminal 12a, but also reflected in the shared content displayed on the display unit 26 of the user terminal 12b. Similarly, for example, the details of the operation performed at the user terminal 12b are reflected not only in the shared content displayed on the display unit 26 of the user terminal 12*b*, but also reflected in the shared content displayed on the display unit 26 of the user terminal 12*a*.

Therefore, for example, when virtual face-to-face sales are performed under a situation in which the user A is a prospective customer and the user B is a seller, it can be said that the content sharing system 10 of this embodiment is a particularly suitable system.

Figure 3A:
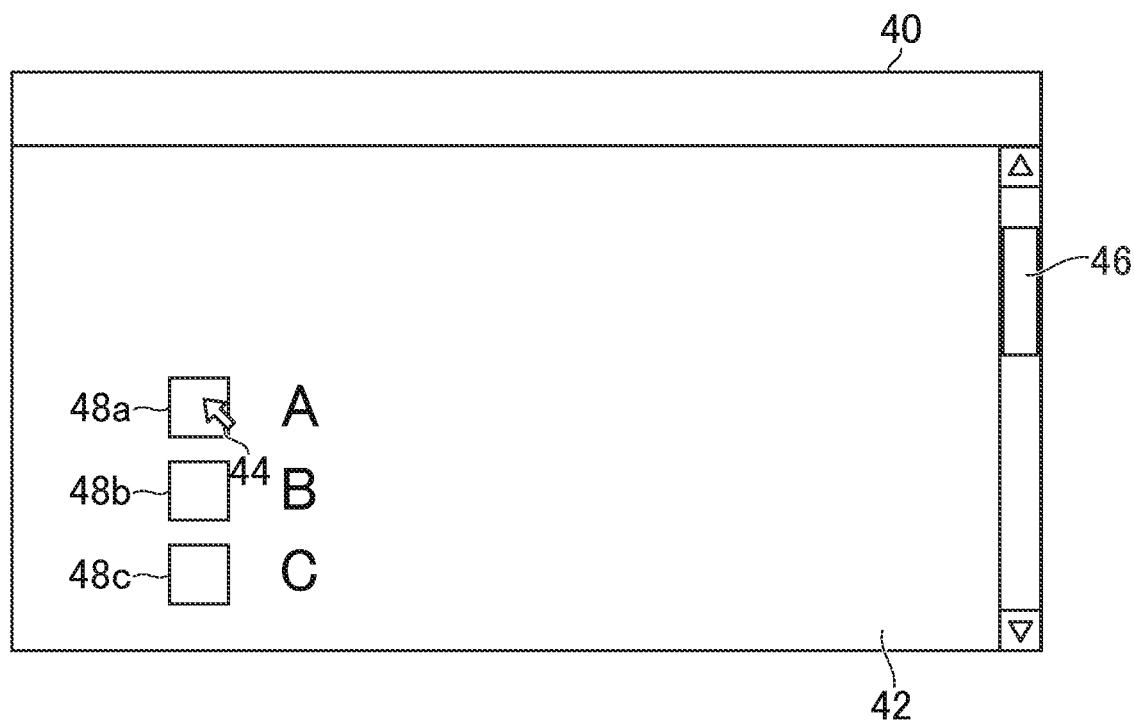
FIG. 3A is a diagram for illustrating an example of a window.

It is assumed, for example, that a webpage is shared between the user terminal 12*a* and the user terminal 12*b*, and that a web browser window 40 illustrated as an example in FIG. 3A is displayed on the display unit 26 of the user terminal 12*a*. In this case, the window 40 is also displayed on the display unit 26 of the user terminal 12*b*.

As illustrated in FIG. 3A, a part of a webpage 42 is arranged in the window 40. The entire webpage 42 does not fit in the window 40. The user A and the user B can visually recognize the part of the entire webpage 42 arranged in the window 40.

A cursor 44 is also illustrated in FIG. 3A. In this embodiment, the shared content displayed on the display unit 26 is shared by the user terminal 12*a* and the user terminal 12*b*, but the position of the cursor 44 is not shared by the user terminal 12*a* and the user terminal 12*b*. That is, the position of the cursor 44 in the user terminal 12*a* and the position of the cursor 44 in the user terminal 12*b* are independent and do not affect each other. The user B does not know the position of the cursor 44 on the user terminal 12*a*, and similarly, the user A does not know the position of the cursor 44 on the user terminal 12*b*.

In this embodiment, both the user A and the user B can scroll the webpage 42 up and down to change the part of the entire webpage 42 arranged in the window 40. For example, the webpage 42 can be scrolled by using the cursor 44 to perform a drag operation on the scroll bar 46 or a click operation on a part above or below the scroll bar 46. In the following description, it is assumed that the webpage 42 is scrolled in the up-down direction, but the webpage 42 may be scrolled in the left-right direction. The webpage 42 may also be scrollable in the up-down and left-right directions.

An operation of scrolling the webpage 42 is hereinafter referred to as "scroll operation", and processing of changing a part of the webpage 42 arranged in the window 40 in accordance with the scroll operation is hereinafter referred to as "scroll processing".

In the webpage 42, various objects are arranged. For example, in the webpage 42 illustrated in FIG. 3A, three selection boxes 48 (48*a*, 48*b*, and 48*c*) are arranged. In addition to this, for example, objects such as a radio button, a "send" button, and a pull-down menu may also be arranged on the webpage 42.

The user can perform a selection operation on an object arranged on the webpage 42. For example, the user can perform a selection operation on a selection box 48 by performing a click operation when the cursor 44 is arranged on the selection box 48.

When a selection operation is performed on an object, predetermined processing corresponding to the selection operation is executed on the object.

For example, when a selection operation is performed on an unchecked selection box 48, the selection box 48 changes to a checked state. Conversely, for example, when a selection operation is performed on a checked selection box 48, the selection box 48 changes to an unchecked state. In this way, processing of changing the check state of the selection boxes 48 is executed on the selection boxes 48 in accordance with the selection operation.

The predetermined processing executed on an object in response to a selection operation on the object is hereinafter referred to as "object processing". In the above-mentioned example, the processing of changing the check state corresponds to object processing on a selection box 48. In this case, the selection operation can be said to be an operation of execution instruction of object processing.

In this embodiment, object processing is determined in advance for each type of object. For example, for a radio button, processing of changing the selection state of a group of radio buttons including the radio button such that the radio button on which the selection operation is performed is brought into a selected state corresponds to object processing. As another example, for a pull-down menu, processing of changing a state of the pull-down menu to a state in which options of the pull-down menu on which the selection operation is performed are displayed in a list corresponds to object processing. As yet another example, for a "send" button, processing of transmitting information indicating the state of each object arranged on the webpage 42 to the server 14 corresponds to object processing.

It is assumed, for example, that the user A is trying to perform a selection operation on the selection box 48*a*, and the cursor 44 is arranged on the selection box 48*a* in the user terminal 12*a*. It is also assumed that the webpage 42 is stopped without being scrolled.

Figure 3B:
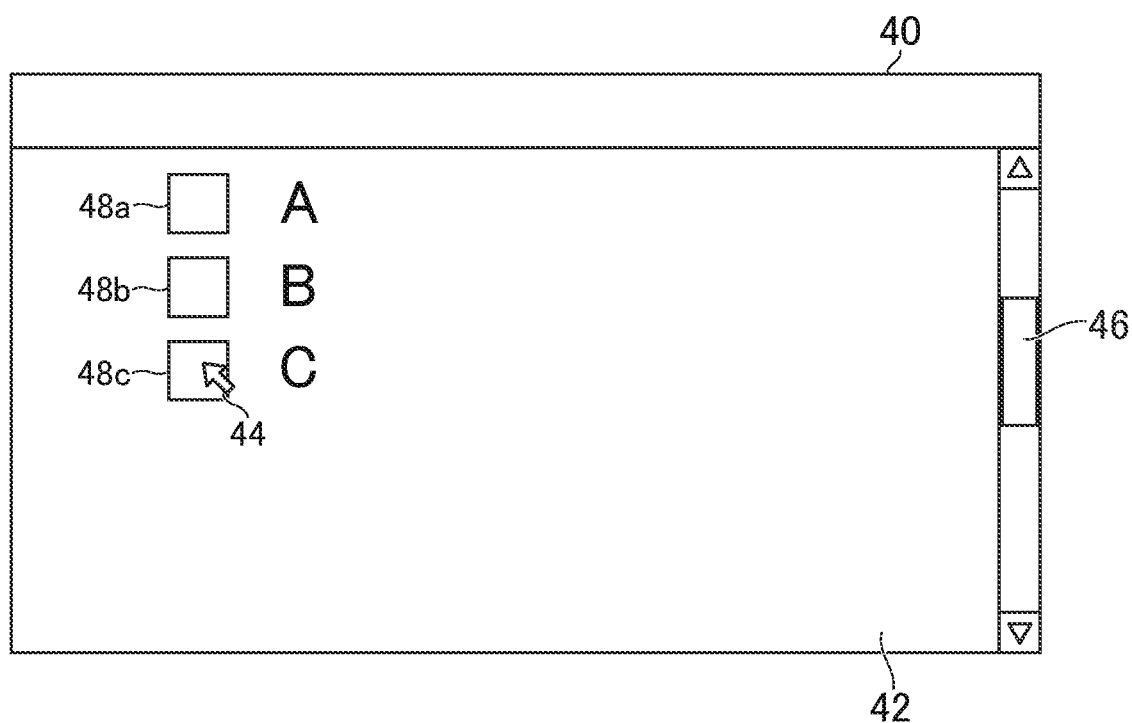
FIG. 3B is a diagram for illustrating an example of a window.

It is further assumed that the user B has performed a scroll operation on the webpage 42 when the user A is trying to perform a selection operation on the selection box 48*a*, and that in the user terminal 12*a* and the user terminal 12*b*, the scroll processing for the webpage 42 has been executed, and the selection box 48*c* is arranged at the position of the cursor 44 illustrated in FIG. 3B. It is also assumed that a selection operation on the selection box 48*a* is subsequently recognized by the user terminal 12*a*.

Figure 3C:
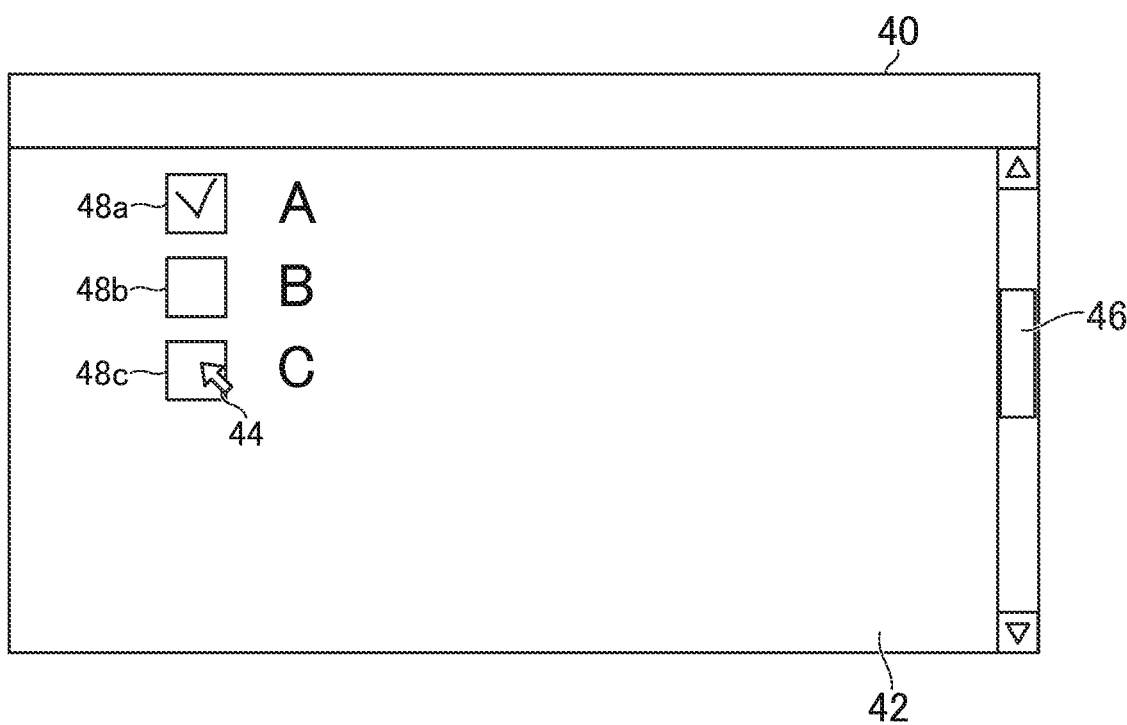
FIG. 3C is a diagram for illustrating an example of a window.

In the above-mentioned situation, in this embodiment, the selection box 48*c* is not in a checked state, which is contrary to the intention of the users, and instead, as illustrated in FIG. 3C, the selection box 48*a* is in a checked state, which conforms to the intention of the users. That is, in this embodiment, object processing is executed on the selection box 48*a*, not on the selection box 48*c*.

This embodiment is not limited to a situation like that described above, in which the webpage 42 is scrolled by an operation of another user when the webpage 42 is stopped without being scrolled. This embodiment is also applicable to a situation in which the scroll speed has been changed by an operation of another user.

Figure 4A:
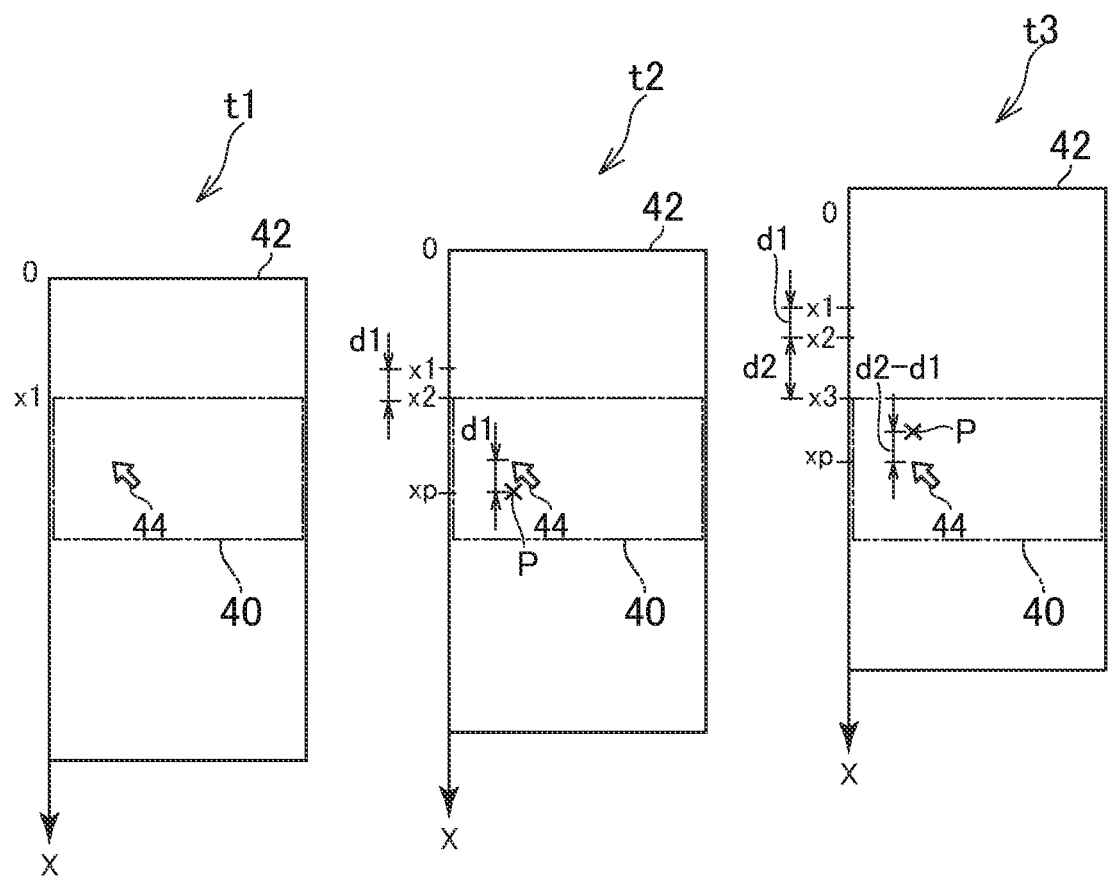
FIG. 4A is a diagram for schematically illustrating an example of a situation in which a scroll speed has been increased by an operation of another user.

FIG. 4A is a diagram for schematically illustrating an example of a situation in which a scroll speed has been increased by an operation of another user. In this case, for example, it is assumed that the scroll speed of the webpage 42 displayed on the user terminal 12*a* has been increased by an operation of the user B.

In FIG. 4A, there is illustrated a relative position of the webpage 42 with reference to the window 40 at each of timings t1, t2, and t3. The relative position of the webpage 42 at the time when the window 40 is used as a reference is expressed through use of a coordinate system in which the upper left corner of the webpage 42 is set as an origin and the downward direction is set as an X-axis positive direction. For example, the relative position of the webpage 42 at the time when the window 40 is used as a reference is expressed by an X coordinate value of a point on the webpage 42 corresponding to a reference point (e.g., point at upper left corner) of the window 40 in this coordinate system.

In the example of FIG. 4A, a value x1, a value x2, and a value x3 are illustrated as the X coordinate values of the webpage 42 at the timing t1, the timing t2, and the timing t3, respectively. In the following description, a value d1 is a signed value obtained by subtracting the value x1 from the value x2, and a value d2 is a signed value obtained by subtracting the value x2 from the value x3. In other words, the value d1 is positive when the value x2 is larger than the value x1, and the value d1 is negative when the value x2 is smaller than the value x1. The value d2 is positive when the value x3 is larger than the value x2, and the value d2 is negative when the value x3 is smaller than the value x2.

In the example of FIG. 4A, it is assumed that the timing t3 is the timing at which the user terminal 12a has recognized a selection operation on the selection box 48a, and that the timing t2 illustrated in FIG. 4A corresponds to a timing that is a predetermined time period T1 earlier than the timing t3.

The time T1 corresponds to, for example, the time from the timing at which the user A attempts to perform the selection operation to the timing at which the user terminal 12a recognizes the selection operation. For example, a time period of about 0.5 second is assumed as the time period T1. The time period T1 is not required to be 0.5 second, and can be freely set. For example, the time period T1 may be set based on experimental results or experience.

The timing t1 illustrated in FIG. 4A corresponds to the timing earlier than the timing t2 by the time period T1.

In the example of FIG. 4A, downward scroll processing is executed on the webpage 42 during the period from the timing t1 to the timing t2, and the X coordinate value of the webpage 42 changes from x1 to x2. During the period from the timing t2 to the timing t3, downward scroll processing on the webpage 42 continues to be executed, and the X coordinate value of the webpage 42 changes to x3. In this case, both the value d1 and the value d2 are positive.

In this embodiment, "downward scroll processing" refers to processing of moving the window 40 downward relative to the webpage 42. Therefore, when downward scroll processing is executed on the webpage 42, as illustrated in FIG. 4A, the webpage 42 moves relatively upward with reference to the window 40.

In the example of FIG. 4A, it is assumed that the value d2 is larger than the value d1. That is, the scroll speed is faster in the period from the timing t2 to the timing t3 than in the period from the timing t1 to the timing t2.

In this situation, there is a high likelihood that the user A assumes that, even in the period from the timing t2 to the timing t3, the webpage 42 is to be scrolled by an operation of the user B at the same speed as in the period from the timing t1 to the timing t2. Therefore, in this case, it is considered that the user intends processing to be executed on the object corresponding to a position P obtained by adding the value d1 to the X coordinate value of the position of the cursor 44 at the timing t2. It is assumed here that the coordinate value corresponding to the position P is expressed as xp. When the value d1 is negative, the position P is above the position of the cursor 44. However, in practice, the webpage 42 is scrolled during the period from the timing t2 to the timing t3 by a length corresponding to the value d2, which is larger than the value d1.

In view of the above, in this embodiment, processing is executed on the object associated with the above-mentioned position P. Specifically, object processing is executed on an object associated with a position obtained by subtracting a value obtained by subtracting the value d1 from the value d2 from the X coordinate value of the position of the cursor 44 at the timing t3. In the example of FIG. 4A, the value d2 is larger than the value d1, and hence the position P at the timing t3 is above the position of the cursor 44.

Based on the above description, there can be similarly described such a situation as illustrated in FIG. 3A to FIG. 3C, in which the webpage 42 displayed on the user terminal 12a is scrolled by an operation of the user B while the webpage 42 is stopped without being scrolled.

Figure 4B:
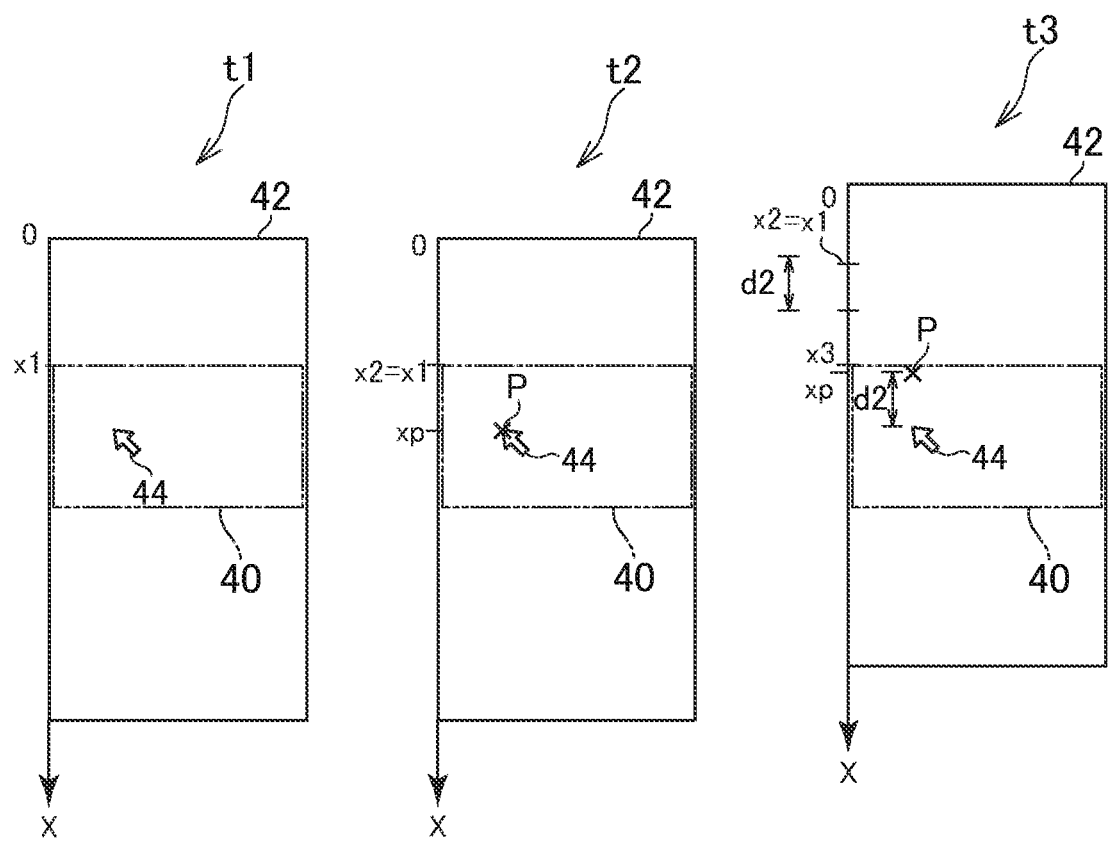
FIG. 4B is a diagram for schematically illustrating an example of a situation in which a webpage is scrolled by an operation of another user when the webpage is stopped without being scrolled.

FIG. 4B is a diagram for schematically illustrating an example of a situation in which the webpage 42 is scrolled by an operation of another user when the webpage 42 is stopped without being scrolled.

In the example of FIG. 4B, the webpage 42 is stopped without being scrolled in the period from the timing t1 to the timing t2. Therefore, the value x1 and the value x2 are the same, and as a result, the value d1 is zero.

Therefore, in this case, processing is executed on the object associated with the position P obtained by subtracting the value d2 to the X coordinate value of the position of the cursor 44 at the timing t3. When the value d2 is negative, the position P is below the position of the cursor 44.

Based on the above description, there can similarly be described a situation in which the scroll speed by the operation of the user B has been decreased.

Figure 4C:
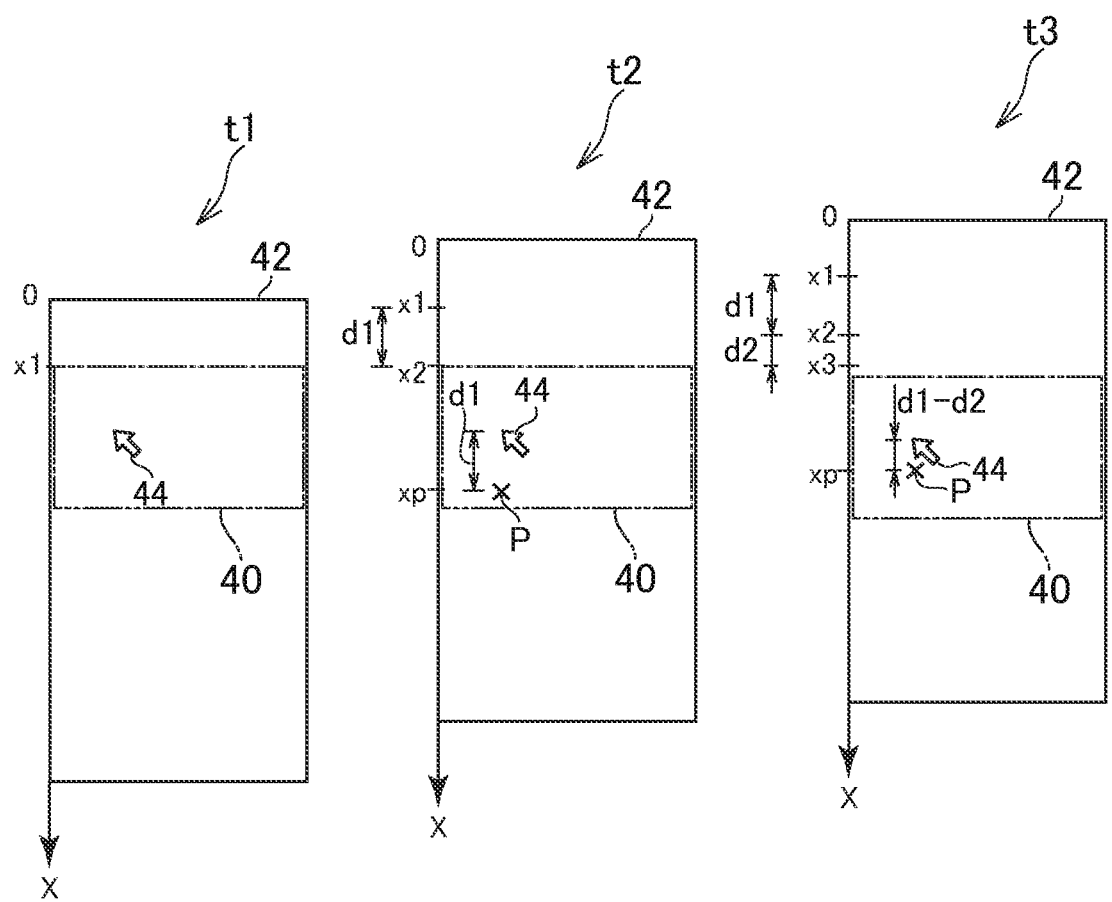
FIG. 4C is a diagram for schematically illustrating an example of a situation in which a scroll speed has been decreased by an operation of another user.

FIG. 4C is a diagram for schematically illustrating an example of a situation in which the scroll speed has been decreased by an operation of another user. In the situation of FIG. 4C, for example, the scroll speed is slower in the period from the timing t2 to the timing t3 than in the period from the timing t1 to the timing t2, and hence the value d2 is smaller than the value d1. Therefore, in this case, the value obtained by subtracting the value d1 from the value d2 is negative. As a result, the position obtained by subtracting the value obtained by subtracting the value d1 from the value d2 from the X coordinate value of the position of the cursor 44 at the timing t3 is below the position of the cursor 44. That is, the position P at the timing t3 is below the position of the cursor 44 by a length corresponding to the value obtained by subtracting the value d2 from the value d1.

Similarly, for example, the above-mentioned processing is also applicable in a situation in which scrolling of the webpage 42 has been stopped by an operation of the user B when the webpage 42 is being scrolled by an operation of the user B.

It is not required to execute object processing on the object arranged at the above-mentioned position P. For example, object processing may be executed on an object having a length from the position P within a predetermined length. As another example, object processing may be executed on the object closest to the position P.

As described above, in this embodiment, in the determination of an object on which object processing is to be executed, consideration is given to scrolling by an operation of another user at the time period T1 until the selection operation timing. Therefore, in this embodiment, it is possible to appropriately process a user operation on the shared content after the shared content has been scrolled by an operation of another user.

It is required that information indicating the changed check state of the selection box 48 be transmitted to the user terminal 12b each time object processing on the selection box 48 is executed. For example, in the situation illustrated in FIG. 3C, it is assumed that not the selection box 48a but the selection box 48c is changed to a checked state. In this case, in order for the processing intended by the user A to be executed, it is required that the user A perform a selection operation on the selection box 48a and then perform a selection operation on the selection box 48*c*. In this case, transmission of the information indicating the check state of the selection box 48, which is originally not required, is redundantly performed twice. According to this embodiment, the occurrence of such redundant processing at the user terminal 12*a* and the user terminal 12*b* and redundant network traffic can be prevented.

The functions of the user terminal 12 in this embodiment and the processing to be executed by the user terminal 12 in this embodiment are now described in detail.

Figure 5:
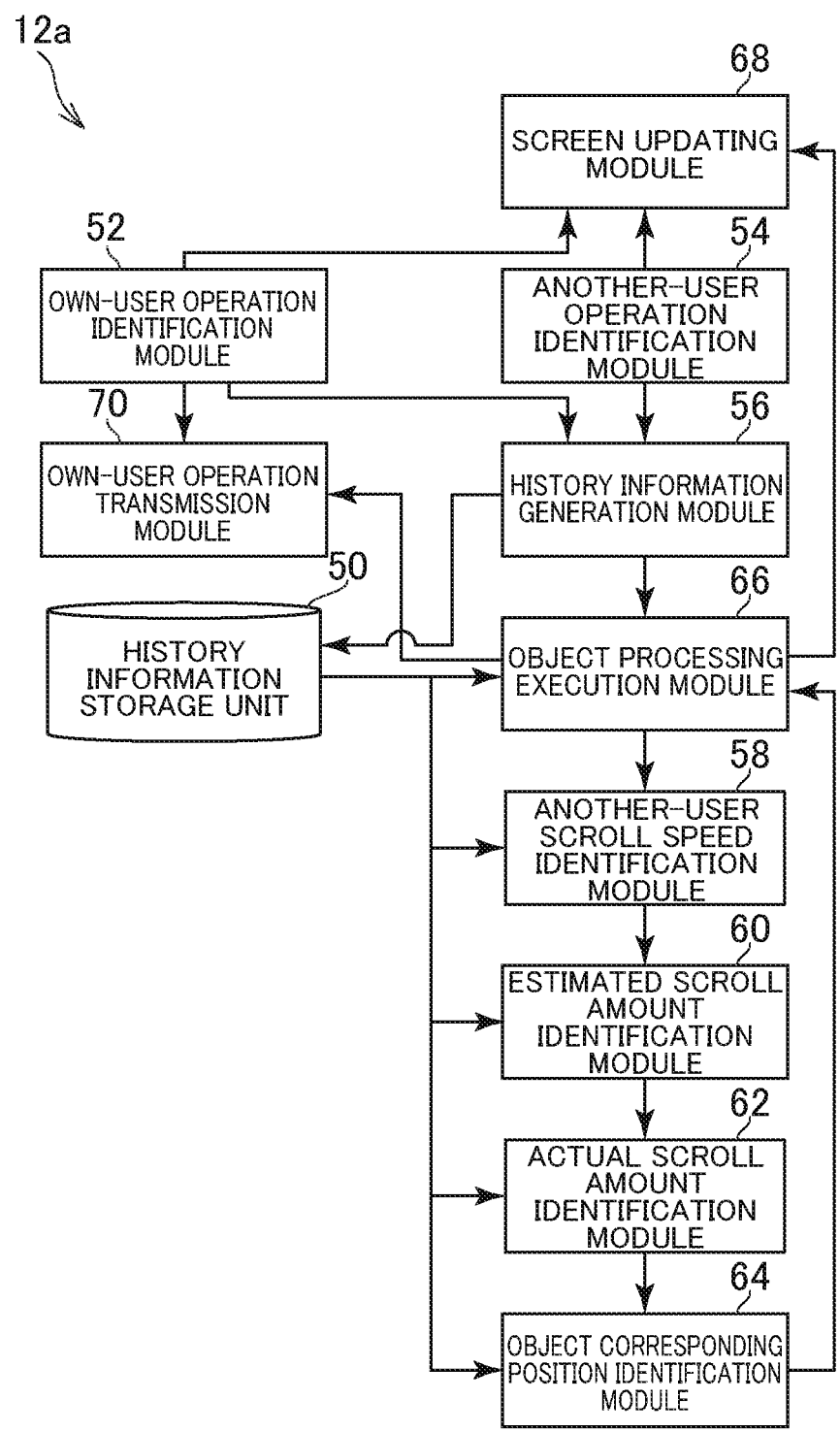
FIG. 5 is a functional block diagram for illustrating an example of functions to be implemented by a user terminal in an embodiment of the present invention.

FIG. 5 is a functional block diagram for illustrating an example of the functions to be implemented by the user terminal 12*a* in this embodiment. It is not required that all of the functions illustrated in FIG. 5 be implemented by the user terminal 12*a* in this embodiment, and functions other than the functions illustrated in FIG. 5 may be implemented. The following functions are similarly implemented by the user terminal 12*b*.

As illustrated in FIG. 5, the user terminal 12*a* in this embodiment includes, in terms of its functions, for example, a history information storage unit 50, an own-user operation identification module 52, an another-user operation identification module 54, a history information generation module 56, an another-user scroll speed identification module 58, an estimated scroll amount identification module 60, an actual scroll amount identification module 62, an object corresponding position identification module 64, an object processing execution module 66, a screen updating module 68, and an own-user operation transmission module 70.

The history information storage unit 50 is mainly implemented by the storage unit 22. The own-user operation identification module 52 is mainly implemented by the processor and the operation unit 28. The another-user operation identification module 54 and the own-user operation transmission module 70 are mainly implemented by the processor 20 and the communication unit 24. The history information generation module 56, the another-user scroll speed identification module 58, the estimated scroll amount identification module 60, the actual scroll amount identification module 62, the object corresponding position identification module 64, and the object processing execution module 66 are mainly implemented by the processor 20. The screen updating module 68 is mainly implemented by the processor 20 and the display unit 26.

The above-mentioned functions may also be implemented by the processor 20 executing a program including commands corresponding to the functions, which is installed in the user terminal 12*a* being a computer. The program may be supplied to the user terminal 12*a* via, for example, a computer-readable information storage medium such as an optical disc, a magnetic disk, a magnetic tape, and a magneto-optical disk, or via the Internet.

In this embodiment, for example, the history information storage unit 50 is configured to store history information indicating a position history of the cursor 44 or an object in the screen. FIG. 6 is a table for showing an example of the history information. In FIG. 6, there is shown a plurality of pieces of history information associated with each of a plurality of times. As shown in FIG. 6, the history information includes a serial number, cursor position information, and object information.

The serial number is, for example, identification information on the history information, and is associated with a generation time of the history information.

The cursor position information is, for example, information indicating the position of the cursor 44 in the screen.

The object information is, for example, information indicating an attribute, for example, the position of the object. In this embodiment, the history information includes a plurality of pieces of object information associated with each object. The object information on the selection box 48*a* is shown representatively in FIG. 6.

The object information includes, for example, position information, size information, scroll user information, and clickability information. The position information is, for example, information indicating the position of the object. The size information is, for example, information indicating the size of the object. The scroll user information is, for example, information indicating a user who executed the scroll operation on the object. The clickability information is, for example, information indicating whether or not the object is clickable.

As shown in FIG. 6, the cursor position information and the position information and size information included in the object information may be expressed by coordinate values. The coordinate values may represent, for example, a position on the screen expressed in a coordinate system having the upper left corner of the screen of the display unit 26 as an origin.

In this embodiment, for example, the own-user operation identification module 52 is configured to identify an operation of the user A on the operation unit 28. The own-user operation identification module 52 may identify the operation of the user A based on input data associated with a physical operation input to be received via the operation unit 28.

For example, the own-user operation identification module 52 may identify that an upward scroll operation has been performed on the webpage 42 by the user A, based on input data indicating that an upward drag operation has been performed on the scroll bar 46. As another example, the own-user operation identification module 52 may identify that a downward scroll operation has been performed on the webpage 42 by the user A based on input data indicating that a downward drag operation has been performed on the scroll bar 46.

The own-user operation identification module 52 may also identify, for example, that a selection operation for specifying a position on the shared content has been performed. In this case, the current position of the cursor 44 may be the position specified in the selection operation.

In this embodiment, for example, the another-user operation identification module 54 is configured to identify an operation of the user B on the user terminal 12*b*. For example, the another-user operation identification module 54 may identify the operation of the user B based on the operation information received via the communication unit 24 and associated with the physical operation input by the user B.

For example, when operation information indicating that an upward scroll operation or a downward scroll operation has been performed is received from the user terminal 12*b*, the another-user operation identification module 54 may identify the upward scroll operation or the downward scroll operation represented by the operation information as the operation of the user B. In this case, the operation information may include information indicating the scroll amount, and the another-user operation identification module 54 may identify the scroll amount in the scroll operation based on that information.

As another example, when operation information representing a selection operation execution instruction of object processing is received from the user terminal 12*b*, the another-user operation identification module 54 may identify the selection operation represented by that operation information as the operation of the user B.

In this embodiment, for example, the history information generation unit 56 is configured to generate history information indicating the position of the cursor 44 or the object at the current time, based on the operation identified by the own-user operation identification module 52 and the operation identified by the another-user operation identification module 54. The history information generation unit 56 stores the generated history information in the history information storage unit 50.

For example, it is assumed that a movement operation on the cursor 44 and an amount of the movement are identified by the own-user operation identification module 52. In this case, history information is generated including cursor position information indicating coordinate values obtained by adding the coordinate values corresponding to the movement amount to the coordinate values indicated by cursor position information in the immediately preceding history information.

As another example, it is assumed that a scroll operation and an amount of the scroll are identified by the another-user operation identification module 54. In this case, coordinate values obtained by adding the coordinate values corresponding to the scroll amount to the coordinate values of the position information included in the object information on the scrolled object in the immediately preceding history information are identified. Then, history information is generated in which those coordinate values are set as position information to be included in the object information on the object. Further, in this case, the user B is set as the scroll user information included in the object information on the scrolled object in the history information.

When there is a change in the size of an object having a variable size, history information is generated in which coordinate values different from those of the size information on the object in the immediately preceding history information are set as the size information on the object.

In this embodiment, for example, the another-user scroll speed identification module 58 is configured to identify the scroll speed of the shared content by an operation of the user B at a time (e.g., timing t2) that is a predetermined time period earlier than the timing of receiving the selection operation. For example, the scroll amount during a predetermined time period (e.g., time period T1) until the timing t2 may be identified as the scroll speed. Specifically, for example, the value d1 of FIG. 4A to FIG. 4C may be identified as the scroll speed.

Figure 7:
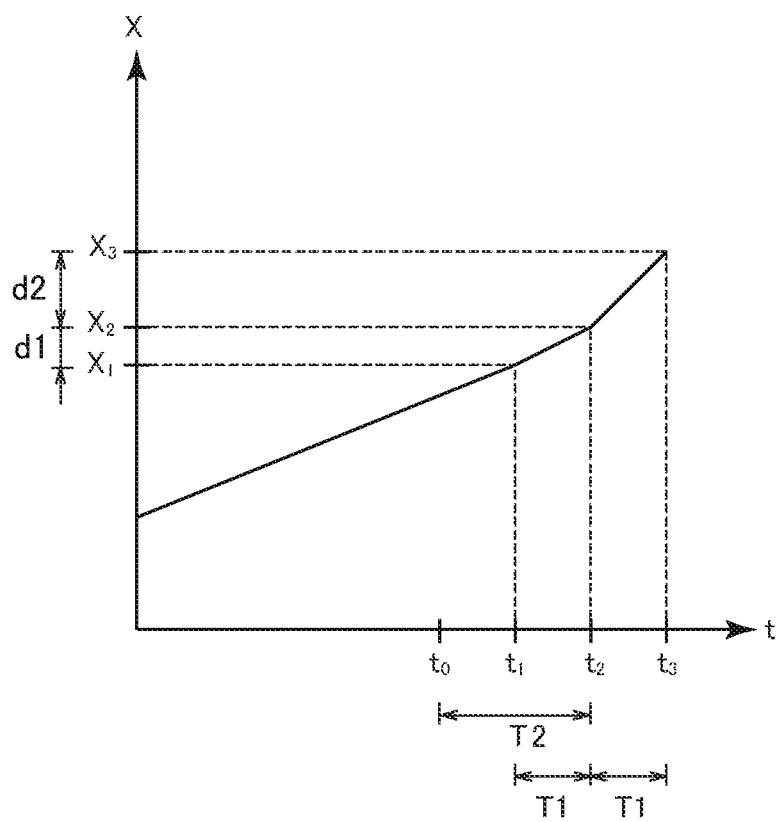
FIG. 7 is a graph for showing an example of a relationship between time and webpage position.

An average scroll speed during a predetermined time period until the timing t2 may also be identified as the scroll speed. For example, as shown in FIG. 7, a value obtained by dividing the scroll amount during the period from a timing t0, which is earlier than the timing t2 by a time period T2, to the timing t2 by the time period T2 may be identified as the scroll speed. The time period T2 may be the same as or different from the time period T1 described above. In the example of FIG. 7, the time period T2 is longer than the time period T1, but the time period T2 may be shorter than the time period T1. The time period T2 can be freely set, and may be set based on experimental results or experience, for example.

The another-user scroll speed identification module 58 may also identify the scroll speed when the own-user operation identification module 52 identifies that a selection operation has been performed.

In this embodiment, for example, the estimated scroll amount identification module 60 is configured to identify an estimated scroll amount of the shared content by the operation of the user B during a predetermined time period until the timing of receiving the selection operation. For example, the estimated scroll amount may be identified based on the scroll amount of the shared content by the user B before a time that is a predetermined time period earlier than the timing of receiving the selection operation. As another example, the estimated scroll amount during the time period T1 from the timing t2 to the timing t3 may be identified.

In this case, the estimated scroll amount corresponds to a scroll amount in the time period T1 from the timing t2 to the timing t3, which is expected by the user A at the timing t2 from the scroll amount by the operation of the user B until the timing t2.

For example, the above-mentioned value d1 may be identified as the estimated scroll amount. Further, the estimated scroll amount may be identified based on the scroll speed identified by the another-user scroll speed identification module 58. For example, a value obtained by multiplying the scroll speed identified by the another-user scroll speed identification module 58 by the time period T1 may be identified as the estimated scroll amount.

In this embodiment, for example, the actual scroll amount identification module 62 is configured to identify an actual scroll amount, which is the actual scroll amount of the shared content by the operation of the user B during a predetermined time period until the timing of the selection operation. For example, the actual scroll amount during the time period T1 from the timing t2 to the timing t3 may be identified. Specifically, the above-mentioned value d2 may be identified as the actual scroll amount.

In this embodiment, for example, the object corresponding position identification module 64 is configured to identify an object corresponding position, which is a position corresponding to an object on which object processing is to be executed. For example, the position P illustrated in FIG. 4A to FIG. 4C corresponds to the object corresponding position. For example, a position on the shared content separated from the position specified in the selection operation (e.g., position of cursor 44) by a difference between the estimated scroll amount and the actual scroll amount may be identified as the object corresponding position.

Further, a position separated from the position of the cursor 44 in the direction in which the scroll speed of the shared content is changing may be identified as the object corresponding position. In the example of FIG. 4A, the change direction of the scroll speed of the webpage 42 is the upward direction with reference to the window 40. In this case, for example, a position above the position of the cursor 44 may be identified as the object corresponding position. In the example of FIG. 4C, the change direction of the scroll speed of the webpage 42 is the downward direction with reference to the window 40. In this case, for example, a position below the position of the cursor 44 may be identified as the object corresponding position.

In this embodiment, for example, the object processing execution module 66 is configured to execute object processing on the object associated with the object corresponding position identified by the object corresponding position identification module 64.

The object processing execution module 66 may identify, for example, the object arranged at the object corresponding position based on the latest history information stored in the history information storage unit 50 and on the object corresponding position. Further, the object processing execution module 66 may identify an object having a length from the object correspondence position within a predetermined length, based on the latest history information stored in the history information storage unit 50 and on the object correspondence position. The object processing execution module 66 may then execute object processing on the identified object.

In this embodiment, for example, the screen updating module 68 is configured to update the screen displayed on the display unit 26 of the user terminal 12a based on the operation identified by the own-user operation identification module 52 and the another-user operation identification module 54, a result of the object processing executed by the object processing execution module 66, and the like.

In this embodiment, for example, the own-user operation transmission module 70 is configured to transmit, to the user terminal 12b, operation information representing the operation identified by the own-user operation identification module 52. When object processing has been executed, the own-user operation transmission module 70 may transmit, to the user terminal 12b, operation information representing a selection operation on the object on which the object processing has been executed. In this way, in the user terminal 12b as well, object processing is executed on the identified object in the same way as in the user terminal 12a.

Figure 8:
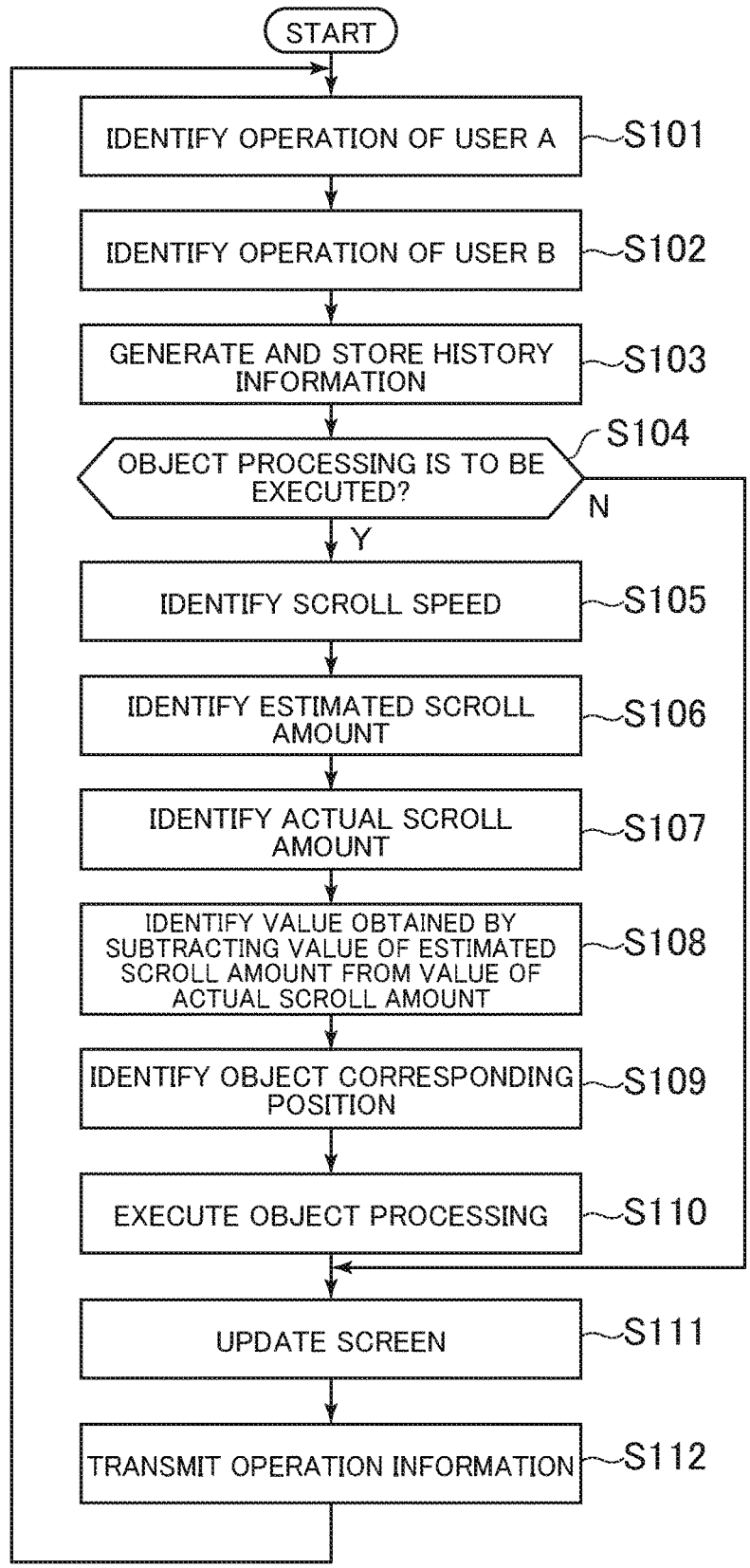
FIG. 8 is a flowchart for illustrating an example of a flow of processing to be performed by the user terminal in the embodiment of the present invention.

Now, a description is given of an example of a flow of processing to be executed by the user terminal 12a in this embodiment with reference to a flowchart illustrated in FIG. 8. The processing illustrated in Step S101 to Step S112 described below is assumed to be repeatedly executed at a predetermined sampling rate.

First, the own-user operation identification module 52 identifies the operation of the user A received via the operation unit 28 of the user terminal 12a (Step S101).

Then, the another-user operation identification module 54 identifies the operation of the user B based on the operation information received from the user terminal 12b via the communication unit 24 of the user terminal 12a (Step S102).

Then, the history information generation module 56 generates history information including a serial number associated with the current loop based on the operation identified in the processing illustrated in Step S101 and the operation identified in the processing illustrated in Step S102, and stores the generated history information in the history information storage unit 50 (Step S103).

Then, the object processing execution module 66 determines whether or not object processing is to be executed in the present loop based on the operation identified in the processing illustrated in Step S101 (Step S104).

When it is determined that object processing is to be executed (Step S104: Y), the another-user scroll speed identification module 58 identifies the scroll speed of the webpage 42 by the operation of the user B at a timing earlier than the current time by the time period T1 based on the history information stored in the history information storage unit 50 (Step S105).

Then, the estimated scroll amount identification module 60 identifies the estimated scroll amount based on the scroll speed identified in the processing illustrated in Step S105 (Step S106).

Then, the actual scroll amount identification module 62 identifies the actual scroll amount of the webpage 42 by the operation of the user B during the time period T1 until the current time (Step S107).

Then, the object corresponding position identification module 64 identifies a value obtained by subtracting the value of the estimated scroll amount identified in the processing illustrated in Step S106 from the value of the scroll amount identified in the processing illustrated in Step S107 (Step S108).

Then, the object corresponding position identification module 64 identifies a position obtained by subtracting the value identified in the processing illustrated in Step S108 from the X coordinate value of the current position of the cursor 44 as the object corresponding position (Step S109).

Then, the object processing execution module 66 executes object processing on the object corresponding to the object corresponding position identified in the processing illustrated in Step S109 (Step S110).

When it is determined in the processing illustrated in Step S104 that object processing is not to be executed (Step S104: N), or when the processing illustrated in Step S110 has ended, the screen updating module 68 updates the screen displayed on the display unit 26 of the user terminal 12a (Step S111).

Then, the own-user operation transmission module 70 transmits to the user terminal 12b operation information representing the operation identified in the processing illustrated in Step S101 (Step S112), and returns to the processing illustrated in Step S101. In the processing illustrated in Step S112, as described above, operation information representing a selection operation on an object on which object processing has been executed may be transmitted.

In the processing example illustrated in FIG. 8, the method of synchronizing the timing of the operation of the user A and the timing of the operation of the user B is not particularly limited.

For example, in the loop of the processing illustrated in FIG. 8 described above, the processing illustrated in Step S101 may be executed through use of the latest input data, and immediately after that, the processing illustrated in Step S102 may be executed through use of the latest operation information.

As another example, input data associated with a physical operation input by the user A or operation information associated with a physical operation input by the user B may be associated with a time stamp. Then, with the acquisition of both the input data and the operation information associated with the time stamp of the same time as a trigger, the loop of the processing illustrated in FIG. 8 in which the input data and the operation information are used may be started.

Note that, the present invention is not limited to the above-mentioned embodiment.

For example, the object processing execution module 66 may identify the presence or absence of a change in the scroll speed of the webpage 42 before and after the timing t2.

In this case, for example, the presence or absence of a change in the scroll speed may be determined based on an acceleration of the webpage 42 at the timing t2. The acceleration is, for example, identifiable based on a difference between the scroll speed at a predetermined time period immediately before the timing t2 and the scroll speed at a predetermined time period immediately after the timing t2. For example, when the absolute value of the acceleration is smaller than a predetermined value, it may be determined that there is no change in the scroll speed, and when the absolute value of the acceleration is larger than a predetermined value, it may be determined that there is a change in the scroll speed.

The object processing execution module 66 may determine, in accordance with the presence or absence of the change, on which of the object associated with the object corresponding position and the object associated with the current position of the cursor 44 object processing is to be executed. For example, when the absolute value of the acceleration is smaller than the predetermined value, object processing may be executed on the object associated with the object corresponding position, and when the absolute value of the acceleration is larger than the predetermined value, object processing may be executed on the object associated with the current position of the cursor 44.

The object processing execution module 66 may identify, for example, a variation in the speed at the time period T2 from the timing t0 to the timing t2, which is shown in FIG. 7. The object processing execution module 66 may determine, in accordance with the magnitude of the variation in the speed, on which of the object associated with the object corresponding position and the object associated with the current position of the cursor 44 object processing is to be executed.

For example, the time period T2 may be divided into a plurality of sections, and the scroll amount in each section may be identified. When the value of the variance of the identified scroll amounts is larger than a predetermined value, object processing may be executed on the object associated with the current position of the cursor 44. Further, for example, when the value of the variance of the identified scroll amounts is smaller than a predetermined value, object processing may be executed on the object associated with the object corresponding position.

When object processing is to be executed on the object associated with the current position of the cursor 44, it may not always be required to execute identification of the scroll speed, identification of the estimated scroll amount, identification of the actual scroll amount, identification of the object corresponding position, and the like.

For example, when there is an object arranged at the position of the cursor 44 at the time when the selection operation is performed, object processing may be executed on that object. As another example, when there is an object having a length from the position of the cursor 44 at the time when the selection operation is performed within a predetermined length, object processing may be executed on that object.

For example, when it is determined in the processing illustrated in Step S104 illustrated in FIG. 8 that object processing is to be executed (Step S104: Y), the object processing execution module 66 may confirm whether or not there is an object arranged at the current position of the cursor 44. In place of that processing, the object processing execution module 66 may confirm whether or not there is an object having a length from the current position of the cursor 44 within a predetermined length. When it is confirmed that there is such an object, the object processing execution module 66 may execute object processing on that object. Moreover, when it is not confirmed that there is such an object, the processing from Step S105 and the subsequent steps illustrated in FIG. 8 may be executed.

In place of a click operation on the mouse, a tap operation on the touch panel may be treated as an operation of execution instruction of predetermined processing to specify a position on the shared content. As another example, movement or the like of the user in a three-dimensional space identifiable based on an image photographed by the camera unit 30 or the like may be treated as an operation of execution instruction of predetermined processing to specify a position on the shared content.

As yet another example, the content sharing system 10 may include the user terminal 12a and the user terminal 12b connected to each other by peer-to-peer (P2P) or the like, and not include the server 14.

Further, the specific character strings and numerical values described above and the specific numerical values and character strings in the drawings are merely exemplary, and the present invention is not limited to those character strings and numerical values.

The invention claimed is:

1. A content sharing system, comprising:
at least one processor; and
at least one memory device that stores a plurality of instructions, which when executed by the at least one processor, causes the at least one processor to:
identify that a first operation of an execution instruction of a predetermined processing has been performed, said operation being an operation of specifying a first position on shared content operable by both a first user and a second user, which has been performed by the first user;
identify an estimated scroll amount of the shared content by a second operation of the second user during a predetermined time period until a timing of the first operation, based on a scroll amount of the shared content by the second operation performed before a time earlier than the timing of the first operation by the predetermined time period;
identify an actual scroll amount, which is an actual scroll amount of the shared content by the second operation during the predetermined time period until the timing of the first operation;
identify a second position on the shared content, which is separated from the first position on the shared content by a difference between the actual scroll amount and the estimated scroll amount; and
execute the predetermined processing on an object associated with the second position on the shared content.

2. The content sharing system according to claim 1, wherein the at least one memory device that stores the plurality of instructions further causes the at least one processor to:
identify a scroll speed of the shared content by the second operation at a time earlier than a timing at which the first operation is received by the predetermined time period, based on the scroll amount of the shared content by the second operation performed before the time earlier than the timing at which the first operation is received by the predetermined time period, and
identify the estimated scroll amount based on the scroll speed.

3. The content sharing system according to claim 2, wherein the at least one memory device that stores the plurality of instructions further causes the at least one processor to:
identify a product of the identified scroll speed and the predetermined time period as the estimated scroll amount.

4. The content sharing system according to claim 1, wherein the at least one memory device that stores the plurality of instructions further causes the at least one processor to:
execute processing on an object that is arranged in the shared content and has a length from the second position within a predetermined length.

5. A content sharing method, comprising:

identifying that a first operation of an execution instruction of a predetermined processing has been performed, said operation being an operation of specifying a first position on shared content operable by both a first user and a second user, which has been performed by the first user;

identifying an estimated scroll amount of the shared content by a second operation of the second user during a predetermined time period until a timing of the first operation, based on a scroll amount of the shared content by the second operation performed before a time earlier than the timing of the first operation by the predetermined time period;

identifying an actual scroll amount, which is an actual scroll amount of the shared content by the second operation during the predetermined time period until the timing of the first operation;

identifying a second position on the shared content, which is separated from the first position on the shared content by a difference between the actual scroll amount and the estimated scroll amount; and executing the predetermined processing on an object associated with the second position on the shared content.

6. A non-transitory computer readable information storage medium storing a program which is to be executed by a computer to execute the procedures of:

identifying that a first operation of an execution instruction of a predetermined processing has been performed, said operation being an operation of specifying a first position on shared content operable by both a first user and a second user, which has been performed by the first user;

identifying an estimated scroll amount of the shared content by a second operation of the second user during a predetermined time period until a timing of the first operation, based on a scroll amount of the shared content by the second operation performed before a time earlier than the timing of the operation by the predetermined time period;

identifying an actual scroll amount, which is an actual scroll amount of the shared content by the second operation during the predetermined time period until the timing of the first operation;

identifying a second position on the shared content, which is separated from the first position on the shared content by a difference between the actual scroll amount and the estimated scroll amount; and executing the predetermined processing on an object associated with the second position on the shared content.

* * * * *